June 30, 1931.    S. H. EARL    1,812,144
CHUCK
Filed May 14, 1929
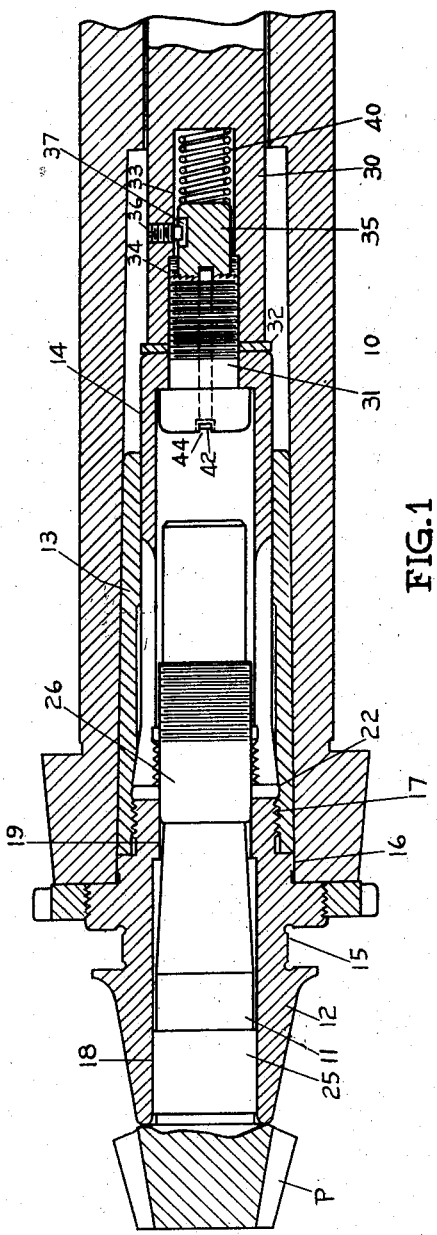
FIG.1
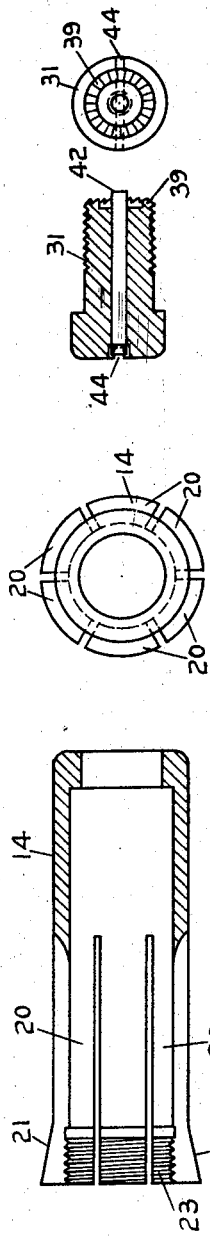
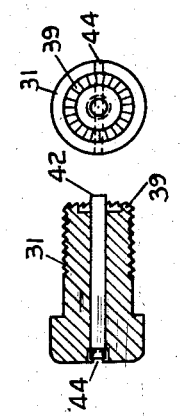
FIG.5
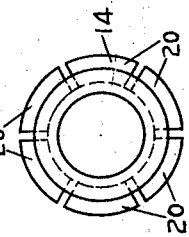
FIG.4
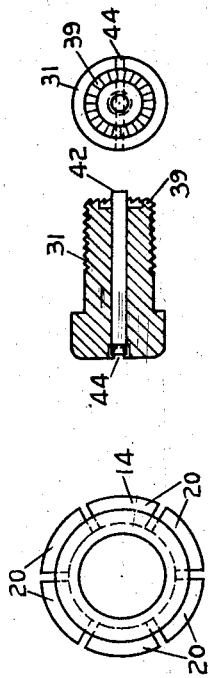
FIG.3
FIG.2
INVENTOR
SCHUYLER H. EARL
BY
ATTORNEY Patented June 30, 1931

1,812,144

UNITED STATES PATENT OFFICE

SCHUYLER H. EARL, OF ROCHESTER, NEW YORK, ASSIGNOR TO GLEASON WORKS, OF ROCHESTER, NEW YORK, A CORPORATION OF NEW YORK

CHUCK

Application filed May 14, 1929. Serial No. 363,039.

The present invention relates to chucking equipment and particularly to chucks for stem gears. More specifically, the present invention relates to chucks of the collet type in which the collet is compressed to grip the work by axial movement of the collet in the work spindle.

The purpose of this invention is to provide a chuck which will not only clamp the work securely but which will center the work with extreme accuracy in the work spindle.

In collet chucks of the type usually employed for chucking stem gears and pinions, both the centering and the gripping is done by the collet, the chuck consisting simply of a collet which is drawn into a tapered sleeve. With this type of chuck, there is always a possibility of the collet becoming canted in the sleeve. Any dirt or grit under one of the fingers or any inaccuracy in the screw, if a screw is used to draw the collet up, will cause the work to be thrown out of center with reference to the axis of the spindle. The error may be ever so slight, but nowadays it is required to cut gears to an accuracy measured in thousandths of an inch and even the slightest eccentricity of the gear or pinion in the work spindle may result in a serious error when the gear or pinion is cut.

In the chuck of the present invention, the collet does only the clamping. A separate member is provided having accurately ground guide surfaces, ground to conform to similar surfaces on the stem of the gear or pinion. When the stem of the gear or pinion is inserted in the work spindle, this guide member holds it truly central in the spindle and when the collet is drawn back, it grips the stem but it cannot throw the stem out of central position.

A further feature of the present invention is the means for adjustably securing the collet to the draw-stem and the means for locking the connecting screw against rotation and for releasing this locking means when it is desired to disconnect the collet from the draw-stem.

With the above and other objects in view, the invention resides in the novel arrangement and combination of parts and in the details of construction hereinafter described and claimed, it being specifically understood that the invention is not limited to the particular structure illustrated in the accompanying drawings and described in the specification, but that the structure may be modified within the scope of the invention and the limits of the appended claims.

One practical embodiment of the invention is illustrated in the accompanying drawings, in which, Figure 1 is a fragmentary longitudinal sectional view through the work spindle of a gear cutting machine, showing one embodiment of my invention in use in securing a stem-pinion in the work spindle;

Figure 2 is a longitudinal sectional view of the collet;

Figure 3 an end elevation of the collet looking at the rear end thereof;

Figure 4 is a longitudinal sectional view through the screw or bolt for securing the collet to the draw-stem; and Figure 5 an end elevation of this screw looking at the rear end of same.

10 indicates the work spindle of, for example, a gear cutting machine and 11 the stem or shank of a pinion P which it is desired to clamp in the work spindle. The spindle 10 is provided with a taper bore as is customary.

The means for clamping the pinion in the work spindle includes the guide member 12, the sleeve 13 and the collet 14. The guide member 12 fits into the bore of the spindle 10. It is provided, for convenience with a tapered nose and, if desired, may be formed with a peripheral groove as indicated at 15 to receive a stock-dividing gauge. In the construction shown, the guide member 12 bears at 16 in the bore of the spindle and is threaded at 17 to engage a correspondingly threaded portion of the sleeve 13. The bearing 16 of the guide member and the internal periphery of the sleeve 13 are tapered to conform to the taper of the bore of the spindle 10. The guide member 12 and the sleeve 13 when connected together are inserted as a unit in the bore of the spindle and drawn back as a unit in this bore in the clamping of the pinion in the spindle.

The guide member is bored on two different diameters to provide two spaced cylindrical bearing surfaces 18 and 19 and these are ground as is the external bearing surface 16 to insure that they will be truly concentric of the spindle axis when the guide member is assembled in the spindle.

The collet is of a usual construction, being formed by slotting a bushing at intervals around its periphery to provide a plurality of resilient gripping fingers 20. The fingers 20 are tapered on their external periphery as indicated at 21. The collet is adapted to fit into the bore of the sleeve 13 and is assembled in the sleeve before the sleeve is threaded to the guide member 12.

A portion of the bore of the sleeve 13 is tapered, as indicated at 22, to conform to the taper 21 of the fingers of the collet. To grip the stem 11 of the pinion, the collet is drawn rearwardly in the sleeve 13 with the result that the taper 22 of the sleeve 13 forces the fingers 20 of the collet inwardly into gripping engagement with the stem 11. If desired, the fingers of the collet may be threaded, as indicated at 23 to provide an internal serrated gripping surface to insure a more tenacious grip on the stem 11 of the pinion.

To clamp the pinion in the spindle, the stem 11 is inserted in the guide member 12. The stem has bearing surfaces 25 and 26, which are ordinarily ground before the teeth are cut in the pinion. These bearing surfaces 25 and 26 are mounted in the anti-friction bearings in which the pinion is assembled in use, as in the rear axle of an automobile. The bearing surfaces 18 and 19 of the guide member 12 are ground to conform to the diameter of the bearing surfaces 25 and 26 of the pinion stem. As the bearing surfaces 18 and 19 have been ground concentric of the spindle axis and the bearing surfaces 25 and 26 are concentric of the pinion axis, it will be seen that when the pinion stem is mounted in the guide member 12 the pinion will be held positively so that its axis coincides with the axis of the work spindle, as is desired to insure extreme accuracy in the cutting of the teeth of the pinion or in the other operations to be performed thereon.

In collet chucks of prior constructions, no guide member was provided. It was assumed that the collet itself would center the pinion in the work spindle as it was drawn back. I have found, however, that should any grit or chips or any foreign particles get under one of the fingers of a collet, the pinion would be warped out of true central position as the collet was drawn back in the work spindle. With the present construction, however, any inaccuracy in the collet regardless of its cause can have no effect on the centering of the pinion in the spindle for the pinion is absolutely centered by the bearing surfaces 18 and 19 of the guide member 12 and the sole action of the collet is to grip and clamp the pinion stem. With the present construction, therefore, a chuck is provided wholly in keeping with the accuracy demanded in gear cutting or in other operations on gears.

There is another advantage in the present construction and that is, that as the collet moves back after having gripped the stem 26, it brings the back of the gear or pinion up against the nose of the guide member 12. The seating of the work piece against this nose serves to hold it more rigidly and at the same time since the nose of the guide member will always be at a fixed distance from the end of the spindle, the pinion or gear will always be held when chucked at a fixed distance from the end of the spindle. Thus a fixed point of reference is always had for the machine settings. In collet type chucks of previous constructions, as the collet moved back in the spindle it carried the gear with it for the full extent of its movement and no definite control was had over the distance that the toothed portion of the gear extended beyond the end of the spindle. It is obvious that the present improved chuck makes for much greater accuracy in gear cutting.

The collet is drawn back in the spindle by a draw-stem 30 which may be threaded at its outer end and actuated by a hand wheel or which may be connected to any other suitable operating mechanism, as, for instance, a hydraulic or a spring actuated chucking device.

In the present instance, the connection between the collet 14 and the draw stem 30 is made by means of a bolt or screw 31 which provides an adjustable connection therebetween and a suitable washer or shim 32 may be interposed between the end of the draw stem 30 and the end of the collet 14 as required by the distance between the two when the threaded adjustment has been made.

The draw stem 30 is bored at 33 as an extension of the threaded opening 34. A block or plug 35 fits into the bore 33 and slides therein. This block or plug 35 acts as a lock for the bolt or screw 31. It is held against rotation by the set-screw 36 which is threaded into the draw stem and the inner end of which engages in a longitudinal slot 37 provided in the plug 35. One end face of the plug 35 is serrated to provide teeth which engage corresponding serrations 39 on the opposed end face of the screw 31. The two serrated surfaces of the plug and screw are normally held in engagement to prevent rotation of the screw by the spring 40 which is mounted in the bore of the draw stem and presses against the plug 35.

To hold the plug 35 away from the screw 31 to permit rotation of the screw, a rod 42 is provided. This rod 42 is mounted slidably in the screw 31, the screw being bored longitudinally for this purpose. The rod is of such length that when the screw 31 has been threaded home to connect the draw stem 30 and the collet 14, the rod will be forced by the engagement of its inner end with the plug 35 into the kerf 44 in the head of the screw 31. It will be seen then that when a screw-driver is inserted in the head of the screw for the purpose of rotating the screw, as to unthread the same, that the screw-driver will first engage the rod 42 to force the plug 35 out of engagement with the screw and permit rotation of the screw. The simple movement of engaging the screw-driver with the screw as required for rotating the same acts, therefore, to release the screw.

While I have illustrated a preferred embodiment of my invention in connection with a particular use therefor, it will be understood that the invention is capable of various further modifications and uses and that this application is intended to cover any variations, uses or adaptations of my invention, following in general, the principles of the invention, and including such departures from the present disclosure as may come within known or customary practise in the art to which it pertains and as may be applied to the essential features hereinbefore set forth and as fall within the scope of the invention or the limits of the appended claims.

Having thus described my invention, what I claim is:

1. In a chucking device for securing a gear or similar article in a spindle, the combination with a collapsible collet adapted to be actuated on axial movement thereof in the spindle to grip the stem of the article to be chucked and clamp the same in the spindle, of a guide member mounted in the spindle having a bore ground to provide two spaced cylindrical guide surfaces corresponding to two ground surfaces on the stem for positively centering the stem in the spindle when held in the gripping device.

2. The combination with a spindle, of a rigid, non-distortionable guide member adapted to be mounted in the spindle having a bore ground to provide a guide surface for centering an article to be chucked in the spindle, a collapsible collet having a plurality of tapered gripping fingers, a sleeve secured to the guide member having a tapered bore adapted to cooperate with the collet to actuate the same into gripping position on movement of the collet axially in the sleeve, and means for moving the collet axially to actuate the same to clamping position and thereafter seat all said parts in the spindle.

3. In a chuck for securing a gear or similar article to a spindle, the combination with a collet adapted to be actuated to gripping position on axial movement of the collet in the spindle and a draw stem for moving said collet, of means for securing the collet to the draw stem comprising a screw which engages the collet and threads into the draw stem, a spring-pressed block slidable in the draw stem, means for holding the block against rotational movement, said screw and block having inter-engaging teeth on their opposed end faces whereby when the block engages the screw, the screw is held against rotational movement, and a member connected to the block for disengaging the block from the screw, adapted to extend to a position relative to the head of the screw such that in engaging a suitable tool with the head of the screw to rotate the same the tool first engages said member to release the block.

4. In a chuck, the combination with a gripping device and a draw stem, of means for securing the gripping device to the draw stem comprising a screw and means for locking the screw against rotation comprising a spring-pressed block slidable in the draw stem but held against rotational movement relative thereto and having teeth on its end face adapted to engage teeth on an opposed end face of the screw to lock the screw against rotation, and means for releasing the screw comprising a rod engaging the block at one end and slidable in the screw, said rod being of a length such that when the block is engaged with the screw, the outer end of the rod extends within the kerf formed in the head of the screw.

5. A chucking device for securing a gear or similar article in a spindle, comprising a rigid, non-distortionable guide member which is mounted in the bore of the spindle and centered therein, said guide member being provided with a guide surface adapted to engage the stem of the article to be chucked to center said article in the bore of the spindle and with means for engaging the article to limit axial movement of said article in one direction relative to said guide member, means for limiting axial movement of the guide member in the same direction in the spindle, and a collapsible collet housed in said spindle and adapted to be actuated on axial movement thereof in the prescribed direction to grip the stem of said article and clamp the article in the spindle.

6. A chucking device for securing a gear or similar article in a spindle comprising a rigid, non-distortionable guide member which is mounted in the bore of the spindle and has an external surface adapted to engage the internal surface of the bore of the spindle to center the guide member in the spindle, said guide member being bored to provide an internal guide surface adapted to engage the stem of the article to be chucked to center said article in the spindle and having its end surface formed to engage the rear face of said article to limit axial movement of said article in one direction relative to the guide member, means for limiting axial movement of the guide member in the same direction in the spindle, and a collapsible collet housed in the spindle and adapted to be actuated on axial movement thereof in the prescribed direction to grip the stem of said article and clamp the article in the spindle.

SCHUYLER H. EARL.